United States Patent [19]

Corigliano et al.

[11] Patent Number: 4,788,044

[45] Date of Patent: Nov. 29, 1988

[54] METHOD FOR RECOVERING VANADIUM FROM RESIDUES FROM THE COMBUSTION OF PETROLEUM FRACTIONS

[75] Inventors: Francesco Corigliano; Sebastiana Di Pasquale, both of Messina; Patrizia Primerano, Faro Superiore; Cesare Zipelli, Ragusa, all of Italy

[73] Assignee: Ente Minerario Siciliano, Palermo, Italy

[21] Appl. No.: 72,484

[22] Filed: Jul. 13, 1987

[30] Foreign Application Priority Data

Jul. 17, 1986 [IT] Italy ................. 21161 A/86

[51] Int. Cl.⁴ .................. C01G 31/00; C01G 53/04
[52] U.S. Cl. ........................... 423/62; 423/63; 423/593
[58] Field of Search ............. 423/62, 63, 67, 68, 423/139, DIG. 14, 593

[56] References Cited

U.S. PATENT DOCUMENTS

| | | | |
|---|---|---|---|
| 2,176,610 | 11/1937 | Stamberg | 423/67 |
| 4,100,251 | 7/1978 | Reinhardt et al. | 423/62 |
| 4,474,738 | 10/1984 | Martin | 423/DIG. 14 |
| 4,524,049 | 6/1985 | Sit | 423/68 |
| 4,666,683 | 5/1987 | Brown et al. | 423/DIG. 14 |

FOREIGN PATENT DOCUMENTS

| | | | |
|---|---|---|---|
| 671660 | 10/1963 | Canada | 423/67 |
| 060106 | 5/1973 | Japan | 423/62 |
| 0079840 | 6/1980 | Japan | 423/139 |

*Primary Examiner*—John Doll
*Assistant Examiner*—Wayne A. Langel
*Attorney, Agent, or Firm*—Guido Modiano; Albert Josif

[57] ABSTRACT

A method is described for recovering vanadium from residues from the combustion of petroleum fractions, wherein the residues, such as ash and soot, are leached with aqueous $H_2SO_4$ to extract vanadium and any additional polyvalent cations contained therein. The acid leaching solution, after oxidation of the extracted cations, is treated with a complexing agent, in particular EDTA or salts thereof, and then with ammonia to selectively precipitate vanadium as highly pure ammonium polyvanadate.

10 Claims, No Drawings

METHOD FOR RECOVERING VANADIUM FROM RESIDUES FROM THE COMBUSTION OF PETROLEUM FRACTIONS

BACKGROUND OF THE INVENTION

The present invention relates to an improved method for recovering vanadium from residues from the combustion of petroleum fractions, in particular heavy fractions of petroleum.

The addition of magnesium oxide in the combustion of petroleum derivates or fractions, in particular heavy fractions, is now generally employed in thermoelectric power plants since it preserves the plant from corrosion, by lowering the acidity of the flue gases, for a much longer time.

Consequently, for those crude oils which naturally contain very little iron, the presence of iron in the solid residues of combustion (ash and soot) has been considerably decreased, since the part thereof originating from corrosion has been eliminated. It is not infrequent (though this is not always the case) to find iron contents below 1% in the ash of the electric filters of power plants powered by fuel oil, this being a great advantage for the recovery of vanadium from this ash, with respect whereto iron is in one manner or another an interfering element.

The methods of the prior art for recovering vanadium from the residues of petroleum combustion, even when such residues had the above described low iron concentrations, of 1% or less, required a previous separation of this cation; this because the latter, even when it is present at trace levels, interferes with the vanadium precipitation process, making it incomplete.

This preliminary separation step obviously entailed hardly negligible burdens on the process and plant costs.

SUMMARY OF THE INVENTION

The aim of the present invention is to provide a method for recovering vanadium from residues of the combustion of petroleum fractions, in particular of heavy fractions, which can be performed without a preliminary separation of the iron.

Therefore a further object of the present invention is to provide a simplified vanadium recovery method, which can be effected with a significant saving in investment and running costs.

These and other objects which will become apparent hereinafter are achieved, according to the present invention, by a method for recovering vanadium from the residues from the combustion of petroleum fractions, comprising:

(i) extracting vanadium together with other polyvalent cations contained in said residues which interfere with the vanadium recovery by acid leaching of said residues whereby obtaining a solution of said vanadium and said interfering cations, and (ii) treating the resulting acid solution with an oxidizing agent for vanadium and said interfering cations, wherein said method further comprises (iii) adding to said acid solution from (ii) containing oxidized vanadium and interfering cations a complexing agent able to selectively form soluble complexes with the oxidized interfering cations, and (iv) adding to said solution ammonia at a pH of 1.7–2.3 and heating to 70°–100° C., whereby the uncomplexed vanadium is selectively precipitated as ammonium polyvanadate in a form substantially free of said interfering cations.

In particular, the interfering polyvalent cation which is complexed is iron.

A preferred complexing agent usable in the method according to the present invention is ethylenediaminetetraacetic acid (EDTA) or any one of its salts. It is used in amounts of 1–1.5 moles per mole of iron present in the starting residues.

It has been observed that EDTA firmly complexes iron or any other interfering polyvalent cations, preventing any interaction thereof with the vanadium precipitation.

Though it is applicable even to higher iron concentrations, the method according to the present invention is particularly advantageous from an economic point of view when the molar concentration of iron is at the most equal to a third of the concentration of the vanadium to be recovered. This is because the amount of EDTA to be used in the process, and therefore the costs related to this reagent, depend on the concentration of iron.

The method according to the invention comprises a first step of acid leaching of the starting residues, in particular of ash or soot. This is performed by adding 5–15% by weight aqueous sulphuric acid to the starting residues preferably contained in a tank under stirring and heating to 70°–90° C. A ratio of aqueous sulphuric acid to residues of 4–3/1 by weight is used.

The acid solution or leaching solution separated, for example, by filtering, from the insolutes or exhausted residues, contains vanadium and any other polyvalent cations, in particular iron and nickel, extracted from the starting residues.

The insolute, that is to say the exhausted residues, is in the form of a carbon dust, free from appreciable impurities and is therefore usable as carbon black or as fuel.

The acid solution or leaching solution, separated from the insolutes, is treated with an oxidizing agent, for example chlorine gas or sodium chlorate, to oxidize the extracted metallic cations and thus facilitate the subsequent vanadium recovery.

The oxidizing step is preferably performed with heating at 70°–90° C.

Successively, the complexing agent, preferably EDTA or a salt thereof, is added, in a molar ratio of 1–1.5 moles/iron mole, to the leaching solution containing the metallic cations.

Then ammonia, for example as ammonium hydroxide, is added to the leaching solution, up to a pH of 1.7–2.3, and it is heated to 70°–100° C. to precipitate ammonium polyvanadate.

It has been observed that with the method according to the present invention it is possible to precipitate vanadium in a substantially quantitative yield as very pure ammonium polyvanadate, iron or any other interfering polyvalent cations being effectively retained in solution by the complexing agent without being able to interfere and pollute the polyvanadate precipiptate or reduce its yield.

The polyvanadate thus obtained can be converted, by mild calcination at 180°–200° C., into vanadium pentoxide, also highly pure, which is in itself a commercially valuable material.

The ammonia released by the calcination of ammonium polyvanadate is recovered, at least partially, by collecting it in water, and is recycled to the ammonium polyvanadate precipitation step.

The following examples are given only by way of non-limitative illustration of the process according to the present invention, which, as is apparent to the skilled in the art, is susceptible to modifications and variations within the scope of the invention herein described and claimed.

EXAMPLE NO. 1

The method according to the present invention, of selective precipitation, was applied to a sample of ash taken from the electric filters of the ENEL power plant of San Filippo del Mela (Messina, Italy) fuelled by fuel oil mostly deriving from Venezuelan crude, whereto magnesium oxide is added upon combustion.

The percentage composition of the sample used is given hereinafter (g/g, with reference to the dry part at 110° C.):

| vanadium | iron | nickel | magnesium |
|---|---|---|---|
| 7.17% | 0.53% | 0.96% | 1.30% |

This sample was leached with a 10% aqueous solution of sulphuric acid at a ratio of 4 liters per Kg of ash. After one hour of contact at 70°-80° C. under stirring, the leaching solution, separated from the insolute, had the following composition:

| vanadium | iron | nickel | magnesium |
|---|---|---|---|
| 16.13 g/l | 1.28 g/l | 2.35 g/l | 3.18 g/l |
| 0.317 moles/l | 0.023 moles/l | 0.04 moles/l | 0.13 moles/l |

The insolute, after further washing with water, has the appearance of a carbon dust, free from appreciable impurities and therefore usable as carbon black or as fuel.

The leaching solution was heated to 60°-80° C., and to it there were added sodium chlorate in the amount of 7.4 grams per liter of leaching solution, EDTA, in the form of disodium salt, in the amount of 11 grams per liter of leaching solution, and finally, 11% concentrated ammonium hydrate up to a pH of 2. The temperature was then raised to 80°-100° C., and the mixture was stirred for 20-30 minutes. An orange-yellow precipitate was separated, and was easily decantable from the mother liquors. This precipitate, decomposed at 200° C., yielded, for every Kg of treated ash, 111.6 g of 99.5% $V_2O_5$ corresponding to a 97.0% precipitation yield. Moreover, ammonia was evolved from the decomposition oven, and, after collection in water, contributed to the partial reintegration of the ammonia used as reagent.

EXAMPLE NO. 2

Heptahydrate ferrous sulphate, in an amount of 17 g per liter, was added to one liter of acid leaching solution obtained from the same ash with the same method of example 1, thus bringing the iron concentration from 1.28 to 4.50 g/l, i.e. from 0.023 to 0.08 moles/l.

The selective precipitation of vanadium was performed similarly to the previous example, but with a greater amount of sodium chlorate (12.4 g) and EDTA (37 g of the disodium salt). A vanadium precipitation yield of 97.2% was achieved, with a pentoxide purity of 99.5%.

We claim:

1. Method for recovering vanadium from the residues from the combustion of petroleum fractions, comprising:
   (i) extracting vanadium together with other polyvalent cations contained in said residues which interfere with the vanadium recovery by acid leaching of said residues whereby obtaining a solution of said vanadium and said interfering cations, and
   (ii) treating the resulting acid solution with an oxidizing agent for vanadium and said interfering cations, wherein said method further comprises
   (iii) adding to said acid solution from (ii) containing oxidized vanadium and interfering cations a complexing agent able to selectively form soluble complexes with the oxidized interfering cations, and
   (iv) adding to said solution ammonia at a pH of 1.7-2.3 and heating to 70°-100° C., whereby the uncomplexed vanadium is selectively precipitated as ammonium polyvanadate in a form substantially free of said interfering cations.

2. Method according to claim 1, wherein said interferring polyvalent cations comprise iron at a molar concentration at least three times lower than the concentration of the vanadium to be recovered.

3. Method according to claim 2, wherein said complexing agent is selected among ethylenediaminetetraacetic acid and salts thereof.

4. Method according to claim 1, wherein the acid leaching is performed with 5-15% by weight aqueous $H_2SO_4$.

5. Method according to claim 1, wherein said oxidizing treatment is made at 70°-90° C. with an oxidizing agent selected between chlorine gas and sodium chlorate.

6. Method according to claim 1, wherein the ammonium polyvanadate precipitated in step (iv) at 180°-200° whereby obtaining vanadium pentoxide and recovering at least part of the ammonia used as precipitating agent in (iv).

7. Method according to claim 1, wherein solid residues are recovered from the leaching step (i) for use as carbon black or as fuel.

8. Method according to claim 1, wherein said interfering polyvalent cations are selected from iron, nickel, magnesium and their mixtures.

9. A method according to claim 2 wherein said complexing agent is selected among ethylenediaminetetracetic acid and salts thereof and is used in an amount of 1-1.5 moles per mole of iron present in said solutions.

10. Method for recovering vanadium from the residues from the combustion of petroleum fractions, comprising:
   (i) extracting vanadium together with other polyvalent cations contained in said residues which interfere with the vanadium recovery by acid leaching of said residues whereby obtaining a solution of said vanadium and said interfering cations, and
   (ii) treating the resulting acid solution with an oxidizing agent for vanadium and said interfering cations, wherein said method further comprises
   (iii) adding to said acid solution containing oxidized vanadium and interfering cations a complexing agent selected from ethylenediaminetetraacetic acid and salts thereof, said complexing agent selectively forming soluble complexes with the oxidized interfering cations, and
   (iv) adding to said solution ammonia at a pH of 1.7-2.3 and heating to 70°-100° C. so as to selectively precipitate the uncomplexed vanadium as ammonium polyvanadate in a form substantially free of said interfering cations.

* * * * *